United States Patent
Carnevale et al.

(10) Patent No.: US 7,266,083 B2
(45) Date of Patent: Sep. 4, 2007

(54) METHOD AND APPARATUS FOR IMPLEMENTING QUEUE PAIR CONNECTION PROTECTION OVER INFINIBAND

(75) Inventors: Michael Joseph Carnevale, Rochester, MN (US); Charles Scott Graham, Rochester, MN (US); Brent William Jacobs, Rochester, MN (US); Daniel Frank Moertl, Rochester, MN (US); Timothy Jerry Schimke, Stewartville, MN (US); Lee Anton Sendelbach, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 1100 days.

(21) Appl. No.: 10/374,651

(22) Filed: Feb. 26, 2003

(65) Prior Publication Data

US 2004/0165607 A1 Aug. 26, 2004

(51) Int. Cl.
*G01R 31/08* (2006.01)

(52) U.S. Cl. .................. 370/242; 370/412; 710/56
(58) Field of Classification Search ............... None
See application file for complete search history.

(56) References Cited

U.S. PATENT DOCUMENTS

2002/0152315 A1* 10/2002 Kagan et al. ............... 709/228
2004/0042448 A1* 3/2004 Lebizay et al. ............. 370/362

* cited by examiner

Primary Examiner—Duc Ho
(74) Attorney, Agent, or Firm—Joan Pennington

(57) ABSTRACT

A method, apparatus and computer program product are provided for implementing queue pair connection protection over an interconnect network, such as InfiniBand. A message packet is received for a queue pair (QP) and the QP is checked for an imminent connection failure. Responsive to identifying an imminent connection failure, a special message processing mode is established for the QP. After the special message processing mode is established, packets of the message are received without establishing a message queue entry and without storing packet data.

20 Claims, 6 Drawing Sheets

METHOD AND APPARATUS FOR IMPLEMENTING QUEUE PAIR CONNECTION PROTECTION OVER INFINIBAND

FIELD OF THE INVENTION

The present invention relates generally to the data processing field, and more particularly, relates to a method, apparatus and computer program product for implementing queue pair connection protection over an interconnect network, such as InfiniBand.

DESCRIPTION OF THE RELATED ART

Input/output (I/O) networks, such as system buses, can be used for the processor of a computer to communicate with peripherals such as network adapters. However, constraints in the architectures of common I/O networks, such as the Peripheral Component Interface (PCI) bus, limit the overall performance of computers. As a result new types of I/O networks have been introduced.

One new type of I/O network is known and referred to as the InfiniBand network. The InfiniBand network replaces the PCI or other bus currently found in computers with a packet-switched network, complete with zero or more routers. A host channel adapter (HCA) couples the processor to a subnet, and target channel adapters (TCAs) couple the peripherals to the subnet. The subnet typically includes at least one switch, and links that connect the HCA and the TCAs to the switches. For example, a simple InfiniBand network may have one switch, to which the HCA and the TCAs connect through links. Topologies that are more complex are also possible.

InfiniBand networks can interconnect with communication networks. For instance, an Ethernet network adapter may be installed that enables communication over an Ethernet network, which is a common type of communication network. The network adapter has its own TCA for coupling to an InfiniBand network. The InfiniBand specification provides a raw datagram mode of communication to bridge packets received from an Ethernet network for transmission over an InfiniBand network, and vice-versa.

InfiniBand networks provide for communication between TCAs and HCAs in a variety of different manners. In the InfiniBand network data flows between end nodes on logical connections known as Queue Pairs (QPs) across a switched point-to-point fabric. Like other types of networks, InfiniBand networks have a physical layer, a link layer, a network layer, a transport layer, and upper-level protocols. As in other types of packet-switching networks, in InfiniBand networks particular transactions are divided into messages, which themselves are divided into packets for delivery over an InfiniBand network. When received by the intended recipient, the packets are reordered into the constituent messages of a given transaction. InfiniBand networks provide for queues and channels at which the packets are received and sent.

InfiniBand networks allow for a number of different transport services, including reliable and unreliable connections, reliable and unreliable datagrams, and raw packet support.

A problem to be solved is to efficiently implement queue pair connection protection over an interconnect network, such as InfiniBand, that supports reliable delivery. The InfiniBand architecture supports the creation of a reliable connection (known as RC) between two end nodes. The reliable connection both guarantees delivery and supplies end-to-end flow control between end nodes. The InfiniBand architecture specifies that the connection will terminate if too many attempts to deliver fail because of lack of resources at the receiver, for example, if receiver is not replenishing credits for the sender. Connection termination may occur, for instance, in a storage application if the command queue depth supported at the application layer exceeds the hardware capability for the maximum number of messages which may be concurrently in flight as indicated by a current End-to-End flow control value and if the receiving side then encounters a sufficiently long delay while doing other processing prior to replenishing the InfiniBand link with additional message credits to accept the remaining commands. It is desirable to provide a mechanism to avoid such termination of the queue pair connection.

SUMMARY OF THE INVENTION

A principal object of the present invention is to provide a method, apparatus and computer program product for implementing queue pair connection protection over an interconnect network, such as InfiniBand. Other important objects of the present invention are to provide such method, apparatus and computer program product for implementing queue pair connection protection substantially without negative effect and that overcome many of the disadvantages of prior art arrangements.

In brief, a method, apparatus and computer program product are provided for implementing queue pair connection protection over an interconnect network, such as InfiniBand. A message packet is received for a queue pair (QP) and the QP is checked for an imminent connection failure. Responsive to identifying an imminent connection failure, a special message processing mode is established for the QP. After the special message processing mode is established, packets of the message are received without establishing a message queue entry and without storing packet data.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
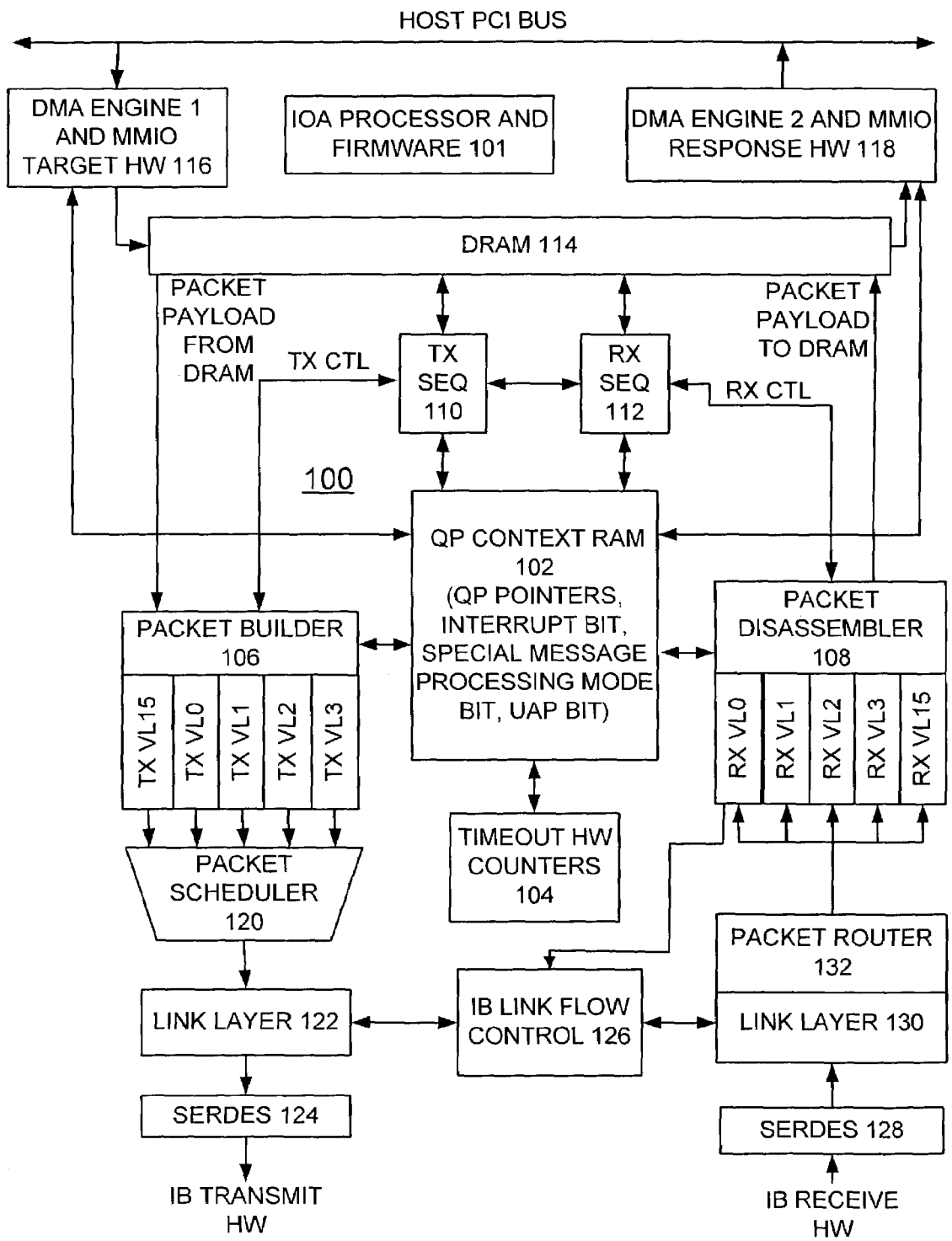
FIG. 1 is a block diagram representation illustrating an InfiniBand (IB) apparatus for implementing queue pair connection protection over an interconnect network in accordance with the preferred embodiment.

Having reference now to the drawings, in FIG. 1, there is shown a network system generally designated by the reference character 100 for implementing queue pair connection protection over an interconnect network in accordance with the preferred embodiment. Network system 100 complies with InfiniBand requirements and is described generally as InfiniBand (IB) input/output adapter (IOA) 100; however, it should be understood that the present invention is not limited to InfiniBand networks and can be used for various other I/O network requirements.

FIG. 1 illustrates an application specific integrated circuit (ASIC) defining network system 100 that handles the transmission and reception of InfiniBand (IB) packets (messages). An input/output adapter (IOA) processor and firmware 101 is provided with the IB IOA 100 for implementing queue pair protection methods of the invention. IOA processor and firmware 101 can be implemented with an embedded or a separate processor together with integral or associated read only memory (ROM) storing microcode and data in accordance with the preferred embodiment. It should be understood that the present invention is not limited to a particular arrangement of the IOA processor and firmware 101.

As shown in FIG. 1, the IOA 100 includes a queue pair (QP) context random access memory (RAM) 102 connected to timeout hardware (HW) counters 104, a packet builder 106 and a packet disassembler 108. The QP context RAM 102 stores a set of queue pointers for each queue pair (QP).

In accordance with features of the preferred embodiment, the QP context RAM 102 stores an interrupt bit for interrupting IOA firmware if resources are not immediately available when the first packet of a message is received. The QP context RAM 102 stores a special message processing mode bit that is used for implementing queue pair connection protection in accordance with the preferred embodiment. The QP context RAM 102 stores an unsolicited acknowledge packet (UAP) bit if needed to communicate a modified End-to-End flow credit count in accordance with the preferred embodiment.

IOA 100 includes a transmit sequencer 110 coupled to the QP context RAM 102 and to the packet builder 106. A receive sequencer 112 is coupled to the local QP context RAM 102 and to the packet disassembler 108. A dynamic random access memory (DRAM) 114 for storing packet payload data is coupled to the transmit sequencer 110, the receive sequencer 112, the packet builder 106, and the packet disassembler 108. IOA 100 includes a first direct memory access (DMA) engine 1 and memory mapped I/O (MMIO) target HW 116 and a second DMA engine 2 and MMIO response HW 118 coupled to a host bus, such as a host PCI bus and DRAM 114. Messages are received from a host operating system (OS) and payload data are transferred to and from the host PCI bus and the DRAM 114. DMA engine 1 and MMIO target HW 116 and DMA engine 2 and MMIO response HW 118 are coupled to the QP context RAM 102. MMIO target HW 116 allows the host OS to write ASIC registers and RAMs. MMIO response HW 118 allows the host OS to read ASIC registers and RAMs.

Packet builder 106 is coupled to InfiniBand (IB) transmit hardware via a packet scheduler 120, a link layer 122, and a serializer-deserializer (SERDES) 124. Packet payload data are transferred from the DRAM 114 to the packet builder 106. An IB link flow control 126 is coupled to the link layer 122. Packet disassembler 108 is coupled to IB receive hardware via a SERDES 128, a link layer 130, and a packet router 132. IB link flow control 126 is coupled to the link layer 130. Packet payload data are transferred from the packet disassembler 108 to the DRAM 114. As shown in FIG. 1, packet builder 106 includes a plurality of transmit (TX) virtual lanes (VLs) and packet disassembler 108 includes a plurality of receive (RX) VLs for multiple queue pairs (QPs).

In accordance with features of the preferred embodiment, the IOA processor and firmware 101 of the invention detects when a connection failure is imminent, and IOA 100 prevents the queue pair connection failure by selectively receiving messages without storing packet data and without establishing a message queue entry. The operations of the invention are implemented entirely by the IOA 100 with no changes or unique features required in the sending node. No changes are required to the upper layer protocol (ULP) implementation since the invention is entirely encapsulated in hardware or very low-level firmware functions of IOA 100 of the invention. The ULP can act as normal with no special processing and does not even need to supply a Receive Queue work queue entry (WQE) to use during the transfer of the messages received without storing packet data. In the special message processing mode of the preferred embodiment, none of multiple message packets composing a message are stored. This invention only affects behavior when a connection termination is imminent, with no performance or other impact until then.

Referring now to FIGS. 2, 3A, 3B, and 4, there are shown flow charts illustrating queue pair connection protection operations of IOA processor and firmware 101 and IOA 100 in accordance with the preferred embodiment. When the packet disassembler 108 receives the first packet of a message, the packet disassembler checks resources to see if buffer space is available to queue the message in the message queue entry and to store the payload data to DRAM 114. A stored maximum message size for each QP can be used in checking for sufficient available buffer space. If sufficient resources are not immediately available the packet builder HW 106 builds a Receiver Not Ready Negative Acknowledge (RNR-NAK) response packet, the packet disassembler 108 discards the received packet and the interrupt bit is set active in the QP Context RAM 102 which will cause the IOA firmware 101 to be interrupted. The interrupt bit is set active in the QP Context RAM 102, for example, by the packet disassembler 108 or the receive sequencer 112. The setting and processing of this interrupt do not cause activity on the IB link to be suspended or otherwise affected so there is no impact on other QPs while this processing is occurring.

Figure 2:
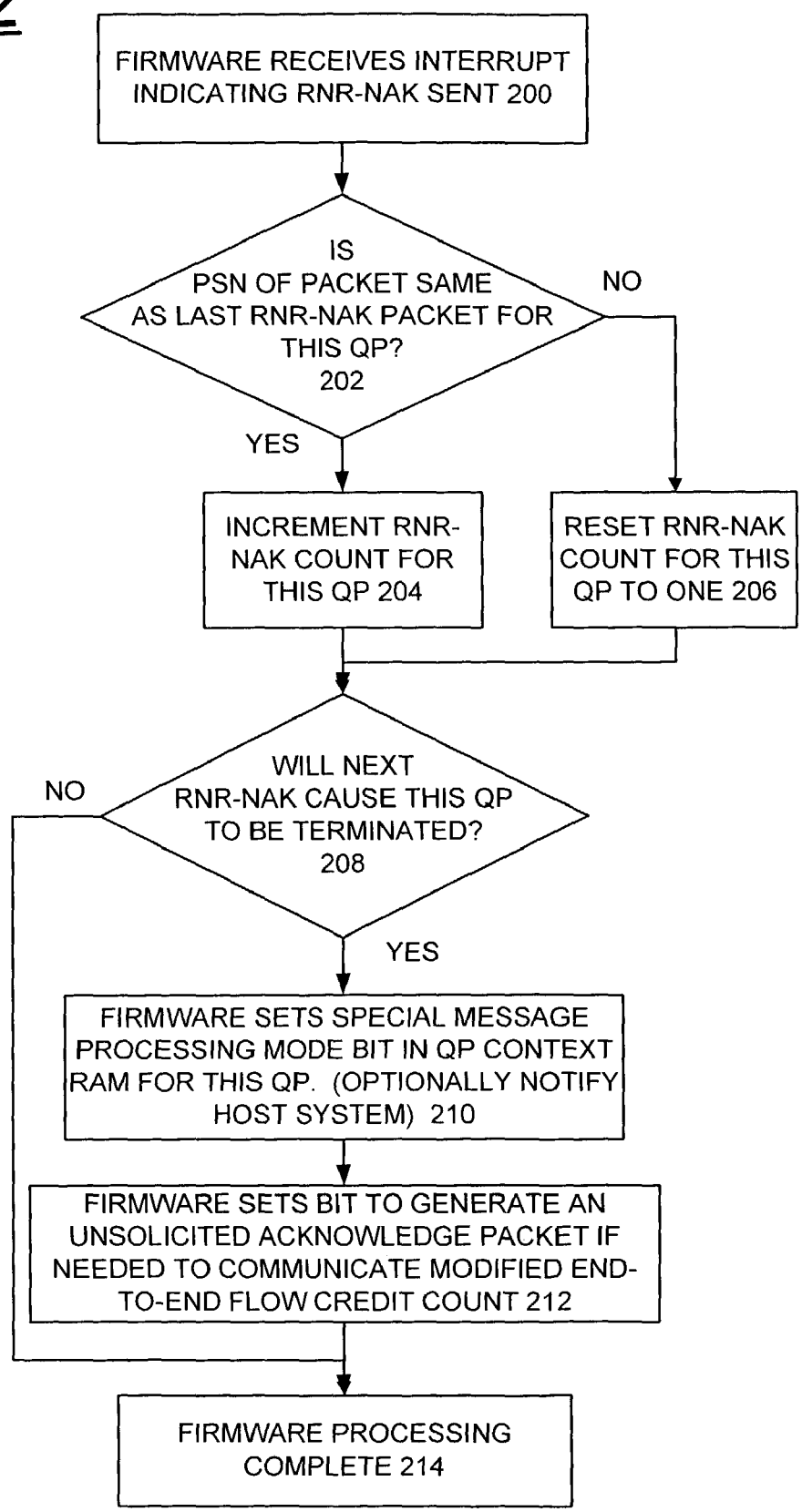
FIGS. 2, 3A, 3B, and 4 are diagrams illustrating queue pair connection protection operations of the apparatus of FIG. 1 in accordance with the preferred embodiment.

Referring now to FIG. 2, there are shown exemplary steps performed by the IOA processor and firmware 101 in accordance with the preferred embodiment. IOA processor and firmware 101 receives an interrupt indicating an RNR-NAK response packet sent as indicated in a block 200. Then IOA processor and firmware 101 examines the expected Packet Sequence Number (PSN) and determines whether an additional RNR-NAK response packet after the current one will cause the connection to be terminated. To identify an imminent connection failure for the QP, firmware 101 keeps a count of the number of RNR-NAK response packets sent for the QP. This RNR-NAK count starts over whenever a message packet is successfully received. To determine when to start the count over firmware 101 remembers the PSN on the last RNR-NAK response packet sent.

As indicated in a decision block 202, checking whether this RNR-NAK has the same PSN as the last RNR-NAK response packet sent for this QP is performed. If this RNR-NAK has the same PSN as the last RNR-NAK response packet sent for this QP, then the RNR-NAK count for this QP is incremented as indicated in a block 204. Otherwise the RNR-NAK count is reset to one as indicated in a block 206 because the different PSN indicates a different message.

In accordance with features of the preferred embodiment, it is guaranteed that IOA 100 will only send an RNR-NAK response packet on the first packet of a message, so there will be no partially transferred messages into either host memory or into IOA buffers of DRAM 114. Packet disassembler 108 does this by making sure there are enough resources available in the IOA 100 so that this entire message can be received in DRAM 114, specifically by making the number of entries in the message queue in the IOA 100 for this QP be at least as great as the maximum number of outstanding host message buffers, that is the maximum End-to-End flow control limit, and by logically pinning any buffer space for this QP to completely handle the next incoming message for this QP.

As indicated in a decision block 208, checking is performed to determine whether an additional RNR-NAK after the current one will cause the connection to be terminated. If firmware 101 has determined that an additional RNR-NAK after the current one will cause the connection to be terminated, as indicated in a block 210 firmware 101 sets a special message processing mode bit active in the QP Context RAM 102 that the packet disassembler 108 examines whenever the packet disassembler receives a message packet, as illustrated and described with respect to FIGS. 3A and 3B. Optionally firmware 101 may notify the host system of this event.

In accordance with features of the preferred embodiment, when this special message processing mode bit is active, the IOA 100 is now in a special message processing mode so that IOA 100 HW is prohibited from sending an RNR-NAK response packet. Instead, packets of the message are received and acknowledged without an entry being placed on the message queue and without payload data being stored to DRAM 114. The IOA 100 HW continues to operate in this special message processing mode until the last packet of a message is received, at which time the special message processing mode bit in the QP Context RAM 102 is cleared. Then the inactive special message processing mode bit causes the next message to be processed normally.

In accordance with features of the preferred embodiment, the End-to-End flow credits that are returned in acknowledge packets are also generated differently than normal while HW of the IOA 100 is in the special message processing mode. The HW that calculates the End-to-End flow credits will always show at least a credit of one in this special message processing mode unless the real credit count is greater than one, then the real credit count is sent in the acknowledge packets when they are generated and sent out. This implies if an acknowledge packet is generated after the last packet of a message that was processed in the special message processing mode, that acknowledge packet would contain the actual credit count which could be zero.

As indicated in a block 212, firmware 101 sets the UAP bit to generate an unsolicited acknowledge packet if needed to communicate a modified End-to-End flow credit count. This completes firmware processing as indicated in a block 214. This UAP bit is also provided in the QP Context RAM 102 if an unsolicited ACK is needed to transfer the End-to-End flow credits. Firmware can write this UAP bit active and if the HW is in special message processing mode and this bit is active, an acknowledge packet is generated with the End-to-End flow credits set to be the greater of one or the actual flow credits. The HW will always generate an acknowledge packet when the last packet of a message is received while in special message processing mode, but it may be desirable to send an acknowledge packet out sooner even though packets are being received without the Ack Req bit on in the Base Transport Header (BTH).

Figure 3A:
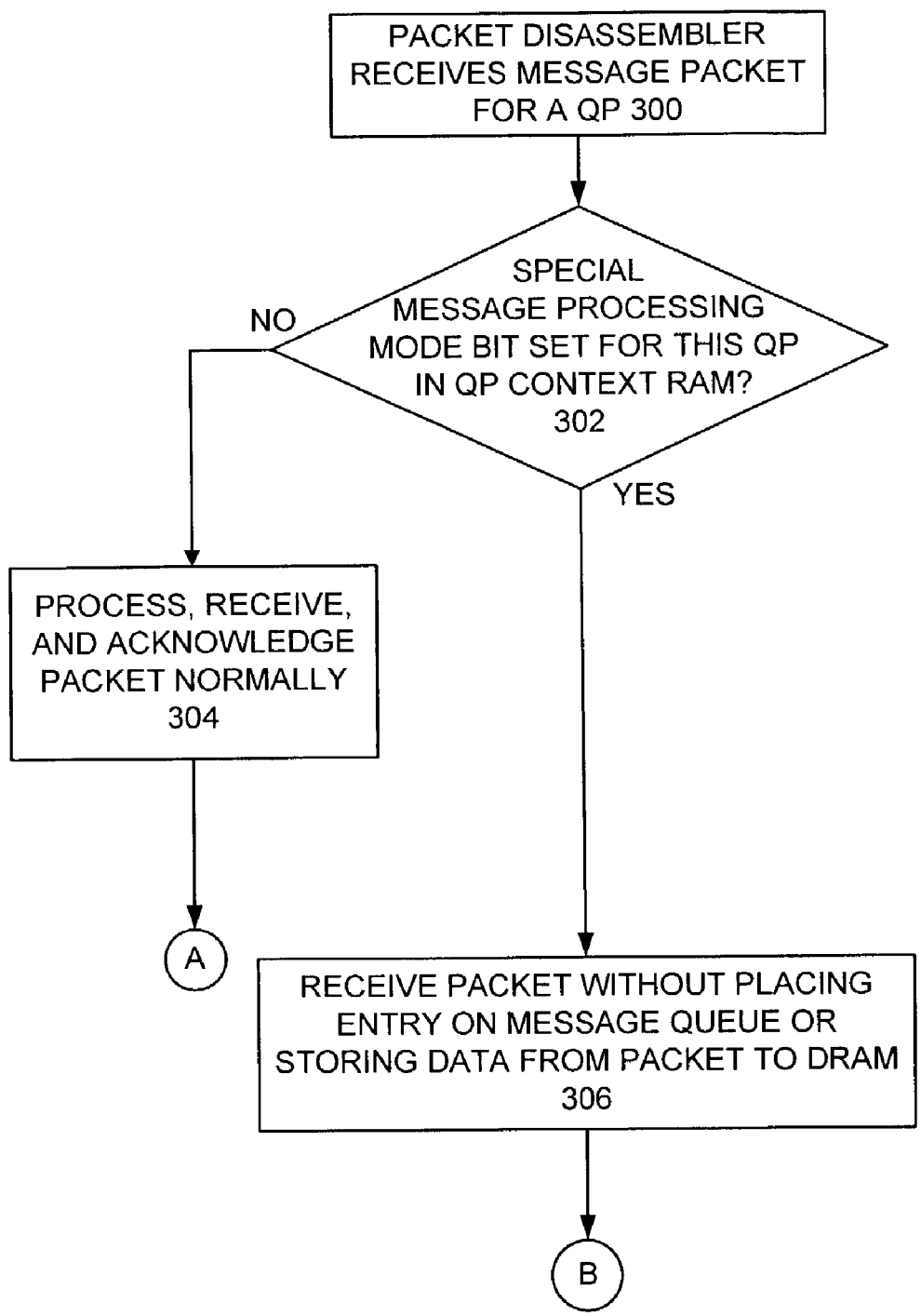
Figure 3B:
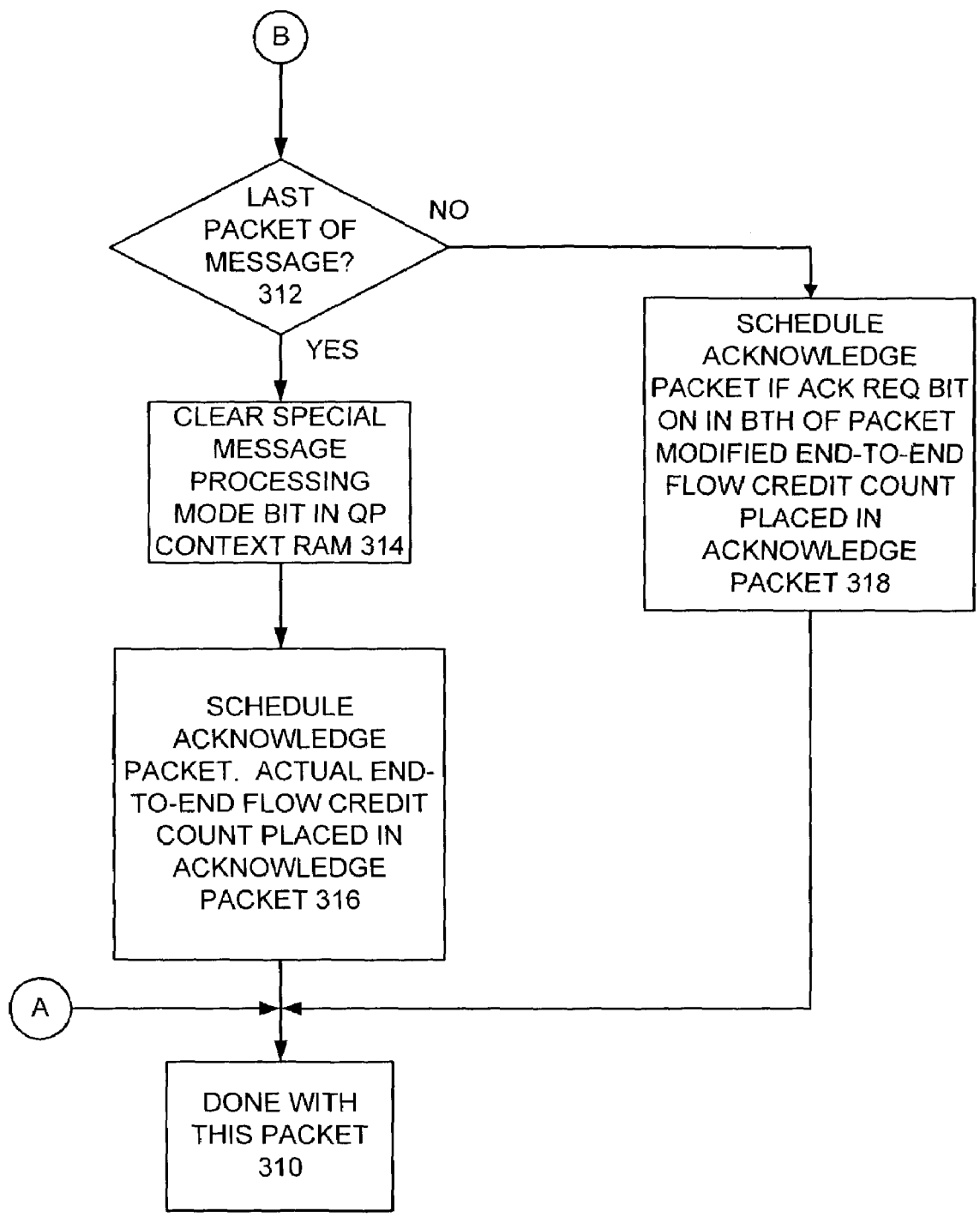

Referring now to FIGS. 3A and 3B, there are shown exemplary steps performed for HW packet processing in accordance with the preferred embodiment. As indicated in a block 300, the packet disassembler 108 receives a message packet for a QP. Checking whether the special message processing mode bit is set by firmware for this QP in the QP context RAM 102 is performed as indicated in a decision block 302.

If the special message processing mode bit is not set by firmware for this QP, then the packet is processed, received and acknowledged normally as indicated in a block 304. Then the sequential steps continue following entry point A in FIG. 3B. As indicated in a block 310 following entry point A in FIG. 3B, this completes the HW packet processing for this packet.

If the special message processing mode bit in the QP Context RAM 102 is set, then the packet is received without placing an entry on a message queue or storing payload data from the packet to DRAM 114 as indicated in a block 306.

The sequential steps continue following entry point B in FIG. 3B, after the packet is received without placing an entry on a message queue or storing payload data from the packet to DRAM 114 at block 306 with the special message processing mode bit in the QP Context RAM 102 set. Then checking for the last packet of a message is performed as indicated in a decision block 312.

If this is the last packet of a message, then the special message processing mode bit in the QP Context RAM 102 is cleared as indicated in a block 314. Then an acknowledge packet is scheduled and an actual End-to-End flow credit count is placed in the acknowledge packet as indicated in a block 316. Otherwise when not the last packet of a message, then an acknowledge packet is scheduled if the Ack Req bit on in the Base Transport Header (BTH) of the packet and a modified End-to-End flow credit count is placed in the acknowledge packet as indicated in a block 318. This completes the HW packet processing for this packet at block 310.

Figure 4:
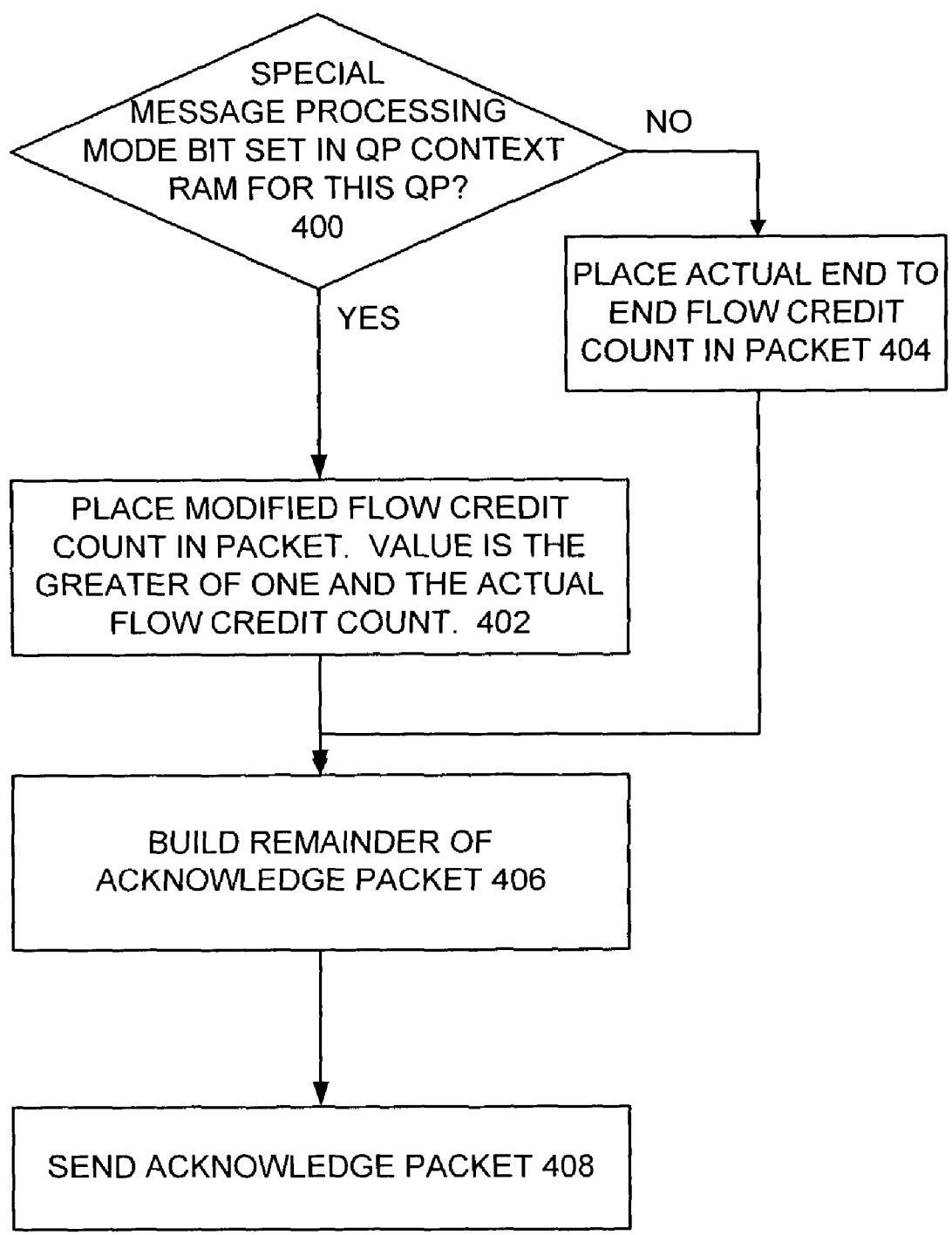

Referring now to FIG. 4, there are shown exemplary steps performed for acknowledge packet processing in accordance with the preferred embodiment. First checking if the special message processing mode bit is set in the QP Context RAM 102 for this QP is performed as indicated in a decision block 400. If the special message processing mode bit in the QP Context RAM 102 is set, then the modified flow credit count is placed in the acknowledge packet as indicated in a block 402. The value of the modified flow credit count at block 402 is the greater of one and the actual flow credit count. Otherwise if the special message processing mode bit in the QP Context RAM 102 is not set, then the actual End-to-End flow credit count is placed in the acknowledge packet as indicated in a block 404. The remainder of the acknowledge packet is built as indicated in a block 406. The acknowledge packet is sent as indicated in a block 408.

Figure 5:
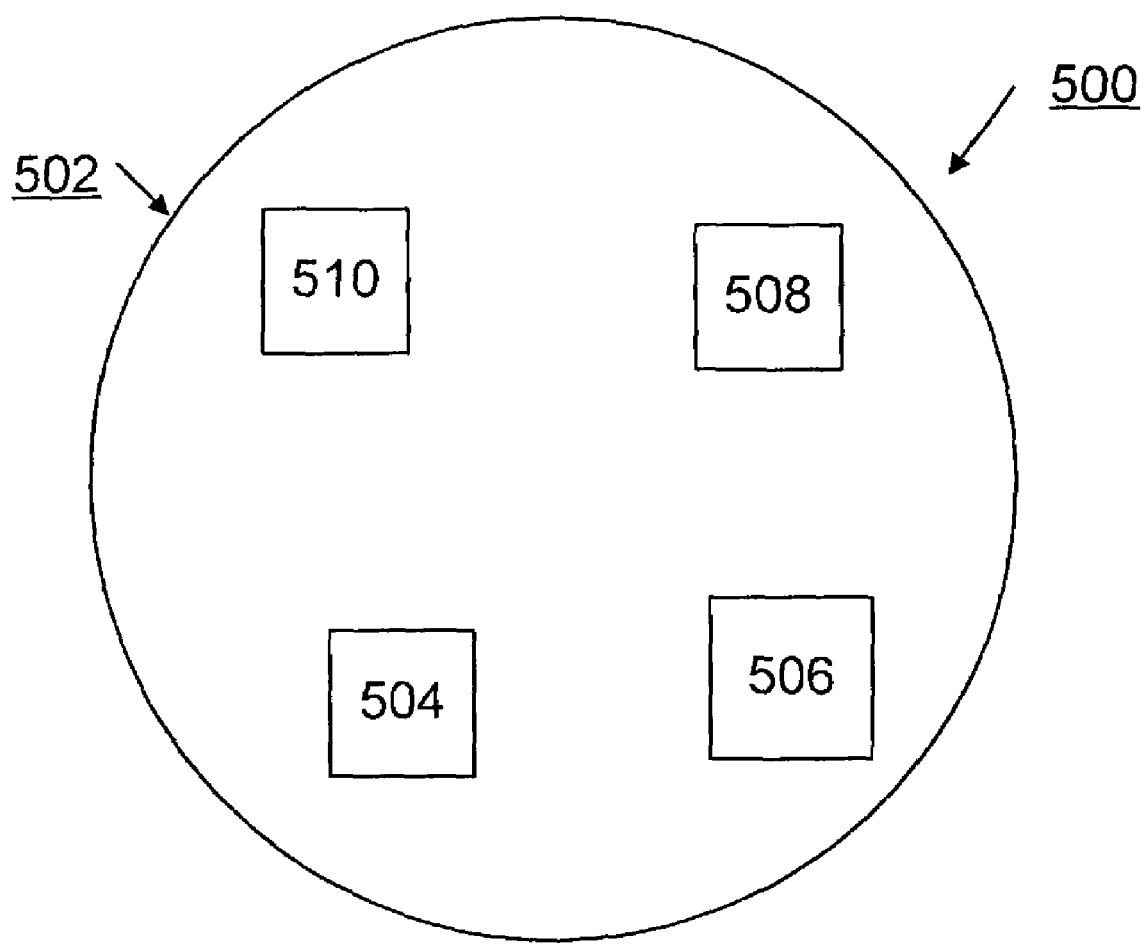
FIG. 5 is a block diagram illustrating a computer program product in accordance with the preferred embodiment.

Referring now to FIG. 5, an article of manufacture or a computer program product 500 of the invention is illustrated. The computer program product 500 includes a recording medium 502, such as, a floppy disk, a high capacity read only memory in the form of an optically read compact disk or CD-ROM, a tape, a transmission type media such as a digital or analog communications link, or a similar computer program product. Recording medium 502 stores program means 504, 506, 508, 510 on the medium 502 for carrying out the methods for implementing queue pair connection protection of the preferred embodiment in the system 100 of FIG. 1.

A sequence of program instructions or a logical assembly of one or more interrelated modules defined by the recorded program means 504, 506, 508, 510, direct the computer system 100 for implementing queue pair connection protection of the preferred embodiment.

While the present invention has been described with reference to the details of the embodiments of the invention shown in the drawing, these details are not intended to limit the scope of the invention as claimed in the appended claims.

What is claimed is:

1. A method for implementing queue pair connection protection over an interconnect network comprising the steps of:
   receiving a message packet for a queue pair (QP);
   checking for an imminent connection failure for the QP;
   responsive to identifying said imminent connection failure, establishing a special message processing mode for the QP; and
   responsive to establishing said special message processing mode, receiving packets of the message without establishing a message queue entry and without storing packet data.

2. A method as recited in claim 1 wherein the step of checking for said imminent connection failure for the QP includes the steps of identifying a sent Receiver Not Ready Negative Acknowledge (RNR-NAK) response packet, and setting an interrupt.

3. A method as recited in claim 2 further includes the steps of maintaining an RNR-NAK count.

4. A method as recited in claim 3 further includes the steps of checking if sending a next RNR-NAK response packet causes the QP to terminate for identifying said imminent connection failure.

5. A method as recited in claim 4 wherein the step of establishing said special message processing mode for the QP includes the steps of providing a QP context memory; and setting a special message processing mode bit in said QP context memory for the QP responsive to identifying said imminent connection failure.

6. A method as recited in claim 2 further includes the step of comparing a Packet Sequence Number (PSN) of the received message packet and a last RNR-NAK response packet for the QP.

7. A method as recited in claim 6 further includes the steps of incrementing an RNR-NAK count responsive to a match; and resetting said RNR-NAK count responsive to no match.

8. A method as recited in claim 1 wherein the step of establishing said special message processing mode for the QP includes the steps of setting a special message processing mode bit in said QP context memory for the QP responsive to identifying said imminent connection failure.

9. A method as recited in claim 8 includes the step of setting an unsolicited acknowledge packet bit in said QP context memory for communicating a modified End-to-End flow credit count.

10. A method as recited in claim 8 includes the steps of clearing said special message processing mode bit responsive to receiving a last packet of a message.

11. A method as recited in claim 1 wherein the step of checking for said imminent connection failure for the QP includes the steps of receiving a first packet of a message; and checking a count of Receiver Not Ready Negative Acknowledge (RNR-NAK) response packets for the QP.

12. A method as recited in claim 1 wherein the step responsive to establishing said special message processing mode, of receiving packets of the message without establishing a message queue entry and without storing packet data includes the steps of processing and sending acknowledge packets.

13. A method as recited in claim 12 includes the steps of providing a modified End-to-End flow credit count in said acknowledge packet.

14. A method as recited in claim 12 wherein said modified End-to-End flow credit count provided in said acknowledge packet is the greater of one and an actual flow credit count.

15. A method as recited in claim 12 includes the steps of receiving a last packet of a message; and providing an actual End-to-End flow credit count in said acknowledge packet.

16. A computer program product for implementing queue pair connection protection in an interconnect network system, said computer program product including a plurality of computer executable instructions stored on a computer readable medium, wherein said instructions, when executed by the network system, cause the network system to perform the steps of:
   receiving a message packet for a queue pair (QP);
   checking for an imminent connection failure for the QP;
   responsive to identifying said imminent connection failure, establishing a special message processing mode for the QP; and
   responsive to establishing said special message processing mode, receiving packets of the message without establishing a message queue entry and without storing packet data.

17. A computer program product as recited in claim 16 wherein said instructions, when executed by the network system, cause the network system to perform the steps of: selectively storing a special message processing mode bit for each queue pair in a queue pair context memory; and utilizing said special message processing mode bit for establishing said special message processing mode for the QP.

18. A computer program product as recited in claim 17 wherein said instructions, when executed by the network system, cause the network system to perform the steps of receiving a last packet of a message for the QP and clearing said special message processing mode bit.

19. A computer program product as recited in claim 16 wherein the step of checking for said imminent connection failure for the QP includes the steps of identifying a sent Receiver Not Ready Negative Acknowledge (RNR-NAK) response packet, setting an interrupt; and maintaining a count of said sent RNR-NAK response packets for the QP.

20. Apparatus for implementing queue pair connection protection over an interconnect network comprising:
   a packet disassembler for receiving a message packet for a queue pair (QP) and for checking for an imminent connection failure for the QP;
   a queue pair context memory for storing a special message processing mode bit for each queue pair; and
   said packet disassembler responsive to identifying said imminent connection failure, for storing said special message processing mode bit for establishing a special message processing mode for the QP; and responsive to establishing said special message processing mode, for receiving packets of the message without establishing a message queue entry and without storing packet data.

* * * * *